United States Patent Office 2,995,168
Patented Aug. 8, 1961

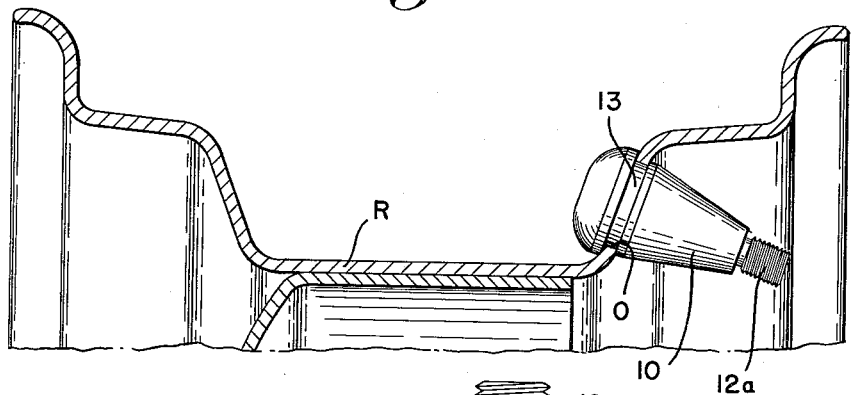
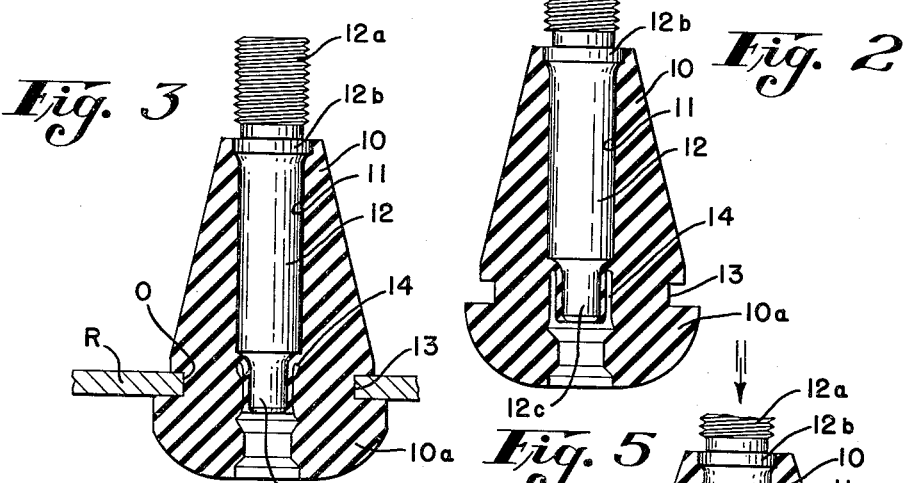
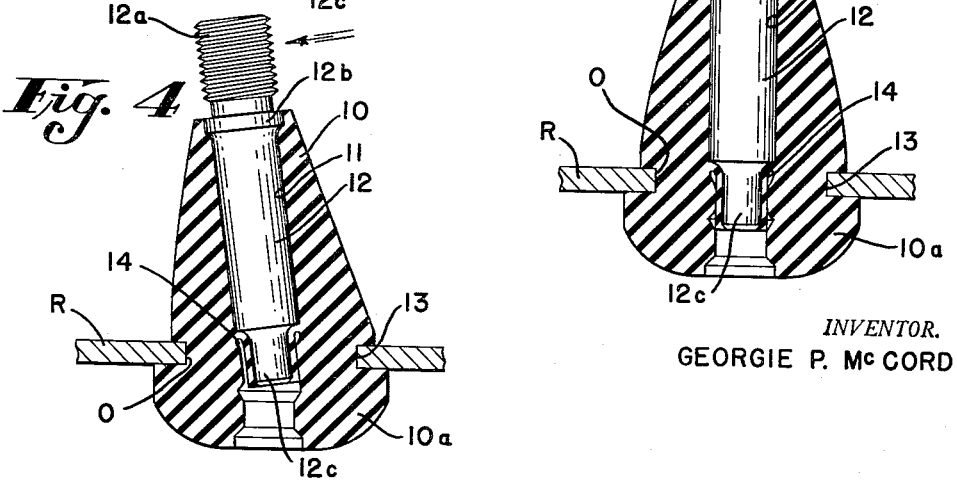
*INVENTOR.*
GEORGIE P. McCORD

2,995,168
TUBELESS TIRE VALVE
Georgie P. McCord, Oaklandon, Ind., assignor to United States Rubber Company, New York, N.Y., a corporation of New Jersey
Filed Oct. 3, 1955, Ser. No. 538,070
6 Claims. (Cl. 152—427)

This invention relates to a valve stem for a tubeless tire of the type having a rigid tubular insert adapted to carry a conventional check valve and an outer resilient rubber covering or casing.

A tubeless tire, as the name implies, has no inner tube. The tire casing and rim together form the air container. The valve for inflating the tire is installed in the usual valve stem opening through the rim.

The object of the present invention is to provide a valve stem in which the outer resilient rubber cover is so constructed as to efficiently anchor the valve stem in the valve opening through the rim for the tubeless tire when the valve stem is inserted therein. More particularly, the object of the present invention is to provide a valve stem in which the outer resilient rubber cover and the inner rigid tubular insert are so structurally related that the stem when installed in the rim opening may withstand considerable force both in a lateral and axial direction without dislodgment thereof from the valve stem opening.

Other objects and advantages of the present invention will become apparent from the following description when read in conjunction with the accompanying drawings wherein:

FIG. 1 is a sectional view of a typical drop center rim commonly used with tubeless tires showing the valve stem of the present invention assembled in the valve stem opening of the rim;

FIG. 2 is a longitudinal sectional view of the valve disassembled from the rim;

FIG. 3 is a sectional view of the valve as installed in the rim showing the details of the internal construction of the valve stem;

FIG. 4 is a sectional view, similar to that of FIG. 3, showing on an exaggerated scale the valve stem under a laterally directed force to illustrate how the valve stem can withstand such a force without dislodgment thereof from the rim opening, and FIG. 5 is a sectional view, similar to that of FIG. 3 showing on an exaggerated scale the valve stem under an axially directed force to illustrate how the valve can withstand such a force without dislodgment thereof from the rim opening.

Referring to the drawings and in particular to FIGS. 1 and 2, the valve stem of the present invention includes an outer resilient rubber cover 10 having an axially extending passageway 11 therethrough. A rigid tubular insert 12 of metal, preferably brass or brass plated metal, or other suitable rigid material, is received in the passageway 11. The cover 10 is bonded to the insert 12 during molding and vulcanizing thereof.

The insert 12 has an outer threaded end 12a adapted to receive the usual valve cap and is threaded internally (not shown) to receive a conventional spring actuated check valve, commonly called a valve core. A flange 12b provided on the insert 12 adjacent the threaded end 12a cooperates with a portion of the mold in the molding of the cover 10 to prevent flow of rubber onto the threaded end 12a.

The cover 10 is provided with a circumferentially extending groove 13 formed in the outer surface thereof intermediate its ends. The valve stem is intended to be installed in the usual valve stem opening O in the rim R by inserting the valve through the valve stem opening O from the inside of the rim until the edge of the rim surrounding the opening O seats in the groove 13. The outer end of the cover 10 adjacent the threaded end 12a of the insert 12 is of a smaller diameter than the valve stem opening O and the cover 10 adjacent both sides of the groove 13 is of substantial greater diameter than that of the valve stem opening O. Preferably, the inner end 10a of the cover 10 has a maximum diameter adjacent the groove 13 substantially greater than that of the cover 10 adjacent the other side of the groove 13 inasmuch as the end 10a does not have to pass through the valve opening O.

The cover 10 is provided with a straight, substantially continuous taper from the edge of the groove 13 to the outer end of the cover thereof adjacent the threaded end 12a of the insert 12 to facilitate the insertion of the valve into the valve stem opening O. This is in contrast to valve stems of this general type heretofore proposed which had a generally concave contour intermediate the outer end of the cover and the groove so as to provide a bulbous or bulging portion adjacent the groove which was deemed necessary to prevent dislodgement of the valve stem from the valve stem opening inwardly of the rim. By reason of this bulging portion, such valve stems were very difficult to install in the rim opening.

The use of a straight, continuous taper is feasible in the valve stem of the present invention because of the provision of certain other structural features, as will be described, which serve to prevent dislodgment of the valve stem from the valve stem opening.

The width of the groove 13, when the valve is unassembled, is slightly less than the thickness of the rim R and the minimum diameter of the groove 13 at the base thereof is slightly larger than the diameter of the valve stem opening O so that the rubber of the casing underlying the groove 13 and engaged by the edge of the rim R surrounding the valve stem opening O is placed under compression when the valve is assembled in the valve stem opening O to thereby effect sealing of the valve stem opening O.

The inner end 12c of the insert 12 extends under the full width of the groove 13 and preferably a short distance past the groove 13. This permits the rubber underlying the groove 13, which anchors the valve stem in the opening O, to be compressed against the end of the insert 12 when the valve stem is installed in the valve stem opening O as shown in FIGS. 1 and 3, thereby insuring effective anchoring and sealing of the valve stem in the opening O.

An annular recess or cavity 14 formed in the cover 10 surrounds the inner end 12c of the insert 12 and extends under the full width of the groove 13, preferably a short distance past each side of the groove 13.

By reason of the cavity or recess 14, there is no direct connection between the inner end 12c of the insert 12 and the rubber of the cover 10 underlying the groove 13 so that the opposed walls of the cavity recess 14 slip on one another when a distorted movement is imparted to the insert 12 by a force applied thereto. Thus distorted movement of the insert 12 tending to dislodge the valve stem from the opening O is not transmitted to the rubber cover underlying the groove 13, which anchors the valve stem in the opening O, with the result that the valve stem will withstand considerable force both in a lateral direction and an axial direction without being dislodged from the opening O as illustrated in FIGS. 4 and 5.

As shown slightly exaggerated in FIG. 4, when a lateral directed force is applied to the end of the insert, the cavity or recess 14 opens up on one side and the opposed walls thereof slip on the other side with the result that the movement of the end of the insert is not transmitted to any substantial extent to the rubber of the cover 10 underlying the groove 13 so that the valve stem is not dislodged from the opening O thereby.

As shown slightly exaggerated in FIG. 5, when an axially directed force is applied to the end of the insert 12, the opposed walls of the cavity or recess also slip on one another with the result that the axial movement of the stem occasioned thereby is not transmitted to any substantial extent to the rubber underlying the groove 13, so that the rubber cover above the groove 13 is not pulled through the opening O but rather mushrooms outwardly thereby increasing the resistance of the stem to being dislodged from the opening O inwardly of the rim R.

As shown in the drawings, the inner end 12c of the insert 12 is preferably of reduced diameter so as to locate the recess or cavity 14 closer to the longitudinal axis of the stem thereby providing more rubber between the cavity recess 14 and the base of the groove 13 to be compressed when the valve is installed in the rim opening O.

From the above description it can be seen that there is provided a valve stem construction which may be easily inserted or installed in the valve stem opening of a rim for a tubeless tire and which once installed will withstand considerable force both in a lateral or axial direction without dislodgment thereof from the valve stem opening.

The term "rubber" is used herein in its generic sense to denote natural rubber, synthetic rubber, and blends thereof. While a preferred form of the invention has been shown and described, it is to be understood that this is for the purpose of illustration only and that modifications and changes can be made therein without departing from the spirit and scope of the invention.

Having thus described my invention, what I claim and desire to protect by Letters Patent is:

1. A valve stem for use with a rim for a tubeless tire comprising an outer resilient rubber cover having an axially extending passageway therethrough, a circumferentially extending groove formed in the outer surface of said cover intermediate the ends thereof for seating engagement with said rim in a valve stem opening therein, said groove having depth such that the diameter of said cover at the base of said groove is slightly larger than the diameter of said valve stem opening, a rigid tubular insert adapted to receive a check valve therein positioned in said passageway and bonded to said cover, said tubular insert having an outer threaded end adapted to receive a valve cap at one end of said cover, said tubular insert extending from said outer threaded end a length to include at least the full width of said groove, and an annular recess internally of said cover surrounding an inner end portion of said insert at least for that length thereof which extends fully across said groove, said annular recess being open to the other end of said cover, said annular recess having width such that it will be closed when said groove is in normal seating engagement with said rim whereby radially extending compression forces imparted to said cover by said rim are supported by said tubular insert.

2. A valve stem for use with a rim for a tubeless tire comprising an outer resilient rubber cover having an axially extending passageway therethrough, a circumferentially extending groove formed in the outer surface of said cover intermediate the ends thereof for seating engagement with said rim in a valve stem opening therein, said groove having depth such that the diameter of said cover at the base of said groove is slightly larger than the diameter of said valve stem opening, a rigid tubular insert adapted to receive a check valve therein positioned in said passageway and bonded to said cover, said tubular insert having an outer threaded end adapted to receive a valve cap at one end of said cover, said tubular insert extending from said outer threaded end a length to include at least the full width of said groove, said tubular insert having a reduced outer diameter portion along that length thereof extending at least across the full width of said groove, and an annular recess internally of said cover surrounding an inner end portion of said insert at least for that length thereof which extends fully across said groove, said annular recess being open to the other end of said cover, said annular recess having width such that it will be closed when said groove is in normal seating engagement with said rim whereby radially extending compression forces imparted to said cover by said rim are supported by said tubular insert.

3. A valve stem for use with a rim for a tubeless tire comprising an outer resilient rubber cover having an axially extending passageway therethrough, a circumferentially extending groove formed in the outer surface of said cover intermediate the ends thereof for seating engagement with said rim in a valve stem opening therein, said groove having depth such that the diameter of said cover at the base of said groove is slightly larger than the diameter of said valve stem opening, the outer surface of said cover being straight tapered substantially from said groove to a diameter less than that of said valve stem opening at one end of said cover to provide a continuous straight surface for facilitating assembly of said valve stem with said rim, a rigid tubular insert adapted to receive a check valve therein positioned in said passageway and bonded to said cover, said tubular insert having an outer threaded end adapted to receive a valve cap at one end of said cover, said tubular insert extending from said outer threaded end a length to include at least the full width of said groove, said tubular insert having a reduced outer diameter portion along that length thereof extending at least across the full width of said groove, and an annular recess internally of said cover surrounding an inner end portion of said insert at least for that length thereof which extends fully across said groove, said annular recess being open to the other end of said cover, said annular recess having width such that it will be closed when said groove is in normal seating engagement with said rim whereby radially extending compression forces imparted to said cover by said rim are supported by said tubular insert.

4. A valve stem for use with a rim for a tubeless tire comprising an outer resilient rubber cover having an axially extending passageway therethrough, a circumferentially extending groove formed in the outer surface of said cover intermediate the ends thereof for seating engagement with said rim in a valve stem opening therein, said groove having width slightly less than the thickness of said rim and having depth such that the diameter of said cover at the base of said groove is slightly larger than the diameter of said valve stem opening, the outer surface of said cover being straight tapered substantially from said groove to a diameter less than that of said valve stem opening at one end of said cover to provide a continuous straight surface for facilitating assembly of said valve stem with said rim, a rigid tubular insert adapted to receive a check valve therein positioned in said passageway and bonded to said cover, said tubular insert having an outer threaded end adapted to receive a valve cap at one end of said cover, said tubular insert extending from said outer threaded end a length slightly beyond the full width of said groove, said tubular insert having a reduced outer diameter portion etxending a length thereof from the inner end of said insert to slightly beyond the full width of said groove, and an annular recess internally of said cover surrounding said reduced outer diameter portion of said insert, said annular recess being open to said passageway at said inner end of said insert, said annular recess having width such that it will be closed when said groove is in normal seating engagement with said rim whereby radially extending compression forces imparted to said cover by said rim are supported by said tubular insert.

5. A valve stem for use with a rim for a tubeless tire comprising an outer resilient rubber cover having an axially extending passageway therethrough, a circumferentially extending groove formed in the outer surface of said cover intermediate the ends thereof for seating engagement with said rim in a valve stem opening therein, said groove having depth such that the diameter of said cover at the base of said groove is slightly larger than the diameter of said valve stem opening, a rigid tubular insert adapted to receive a check valve therein positioned in said passageway and bonded to said cover, said tubular insert having an outer threaded end adapted to receive a valve cap at one end of said cover, said tubular insert extending from said outer threaded end a length to include at least the full width of said groove, and an annular recess surrounding an inner end portion of said insert at least for that length thereof which extends fully across said groove, said annular recess having width such that it will be closed when said groove is in normal seating engagement with said rim whereby radially extending compression forces imparted to said cover by said rim are supported by said tubular insert.

6. A valve stem for use with a rim for a tubeless tire comprising an outer resilient rubber cover having an axially extending passageway therethrough, a circumferentially extending groove formed in the outer surface of said cover intermediate the ends thereof for seating engagement with said rim in a valve stem opening therein, said groove having depth such that the diameter of said cover at the base of said groove is slightly larger than the diameter of said valve stem opening, a rigid tubular insert adapted to receive a check valve therein positioned in said passageway and bonded to said cover, said tubular insert extending from one end of said cover a length to include at least the full width of said groove, and an annular recess surrounding said insert at least for that length thereof which extends fully across said groove, said annular recess having width such that it will be closed when said groove is in normal seating engagement with said rim whereby radially extending compression forces imparted to said cover by said rim are supported by said tubular insert.

References Cited in the file of this patent

UNITED STATES PATENTS

| | | |
|---|---|---|
| 2,049,252 | Eberhard | July 28, 1936 |
| 2,116,090 | Williams | May 3, 1938 |
| 2,769,476 | Herzegh et al. | Nov. 6, 1956 |
| 2,798,530 | Nonnamaker | July 9, 1957 |
| 2,818,101 | Boyer | Dec. 31, 1957 |
| 2,830,641 | Wolfe | Apr. 15, 1958 |
| 2,836,217 | Boyer | May 27, 1958 |
| 2,917,097 | Lee | Dec. 15, 1959 |

OTHER REFERENCES

Tires—TBA Merchandising Magazine Vol. XXXVI, No. 10, May 1955, page 15, published by Dill Brothers, Publishing Corp., 386 Fourth Ave., New York 16, N.Y.